US012371215B1

(12) United States Patent
Ravichandraan

(10) Patent No.: US 12,371,215 B1
(45) Date of Patent: Jul. 29, 2025

(54) VARIETY PACKING SYSTEM

(71) Applicant: Robert Bosch GmbH, Stuttgart (DE)

(72) Inventor: Krupakaran Ravichandraan, Greer, SC (US)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 18/617,106

(22) Filed: Mar. 26, 2024

(51) Int. Cl.
*B65B 59/00* (2006.01)
*B07C 5/36* (2006.01)
*B07C 5/38* (2006.01)
*B65B 65/00* (2006.01)

(52) U.S. Cl.
CPC .............. *B65B 59/00* (2013.01); *B07C 5/362* (2013.01); *B07C 5/38* (2013.01); *B65B 65/003* (2013.01); *B07C 2501/0063* (2013.01); *B65B 2210/02* (2013.01)

(58) Field of Classification Search
CPC ... B65B 59/00; B65B 65/003; B65B 2210/02; B65B 65/006; B65B 21/04; B65B 5/08; B65B 5/105; B65B 35/16; B65B 35/36; B65B 57/10; B65B 57/14; B07C 5/362; B07C 5/38; B07C 2501/0063; B65G 37/00; B65G 47/26; B65G 47/244
USPC ... 53/448, 154, 153, 445, 443, 474, 55, 493, 53/155, 237, 238, 244, 250, 251; 414/220.07; 901/9; 198/394
See application file for complete search history.

(56) References Cited

U.S. PATENT DOCUMENTS 5,328,319 A * 7/1994 Fadaie .................... B65B 5/08
53/238
8,733,069 B2 5/2014 Fischer
9,008,831 B1 4/2015 Jacobs et al.
9,656,771 B2 5/2017 Thompson et al.
9,969,565 B1 * 5/2018 Simm .................... B65B 35/38
(Continued)

FOREIGN PATENT DOCUMENTS

EP 2631185 A1 8/2013

OTHER PUBLICATIONS

Douglas, "PRISMA® Variety Pack Systems," <https://www.douglas-machine.com/products-solutions/variety-pack-systems/prisma/> web page visited Mar. 20, 2024 (4 pages).

(Continued)

*Primary Examiner* — Thanh K Truong
*Assistant Examiner* — Xavier A Madison
(74) *Attorney, Agent, or Firm* — Michael Best & Friedrich LLP

(57) ABSTRACT

A variety packing system includes a donor case unloading station for receiving donor cases having first and second articles, a variety packing conveyor having a packing zone for forming a variety packing case, a conveyance system arranged as a loop between the donor case unloading station and the variety packing conveyor, the conveyance system including a plurality of carriages configured to move along the conveyance system, each carriage of the plurality of carriages configured to receive the first and second articles, a first pick and place system configured to move the first articles and the second articles from the donor case unloading station to the conveyance system, a second pick and place system configured to move the first articles and the second articles from the conveyance system to the variety packing conveyor, and a control system, where the variety packing case includes at least one of the first and second articles.

20 Claims, 8 Drawing Sheets

(56) References Cited

U.S. PATENT DOCUMENTS

| | | | |
|---|---|---|---|
| 10,745,161 B2 | 8/2020 | Notsch | |
| 11,741,519 B2 | 8/2023 | Roffers | |
| 2003/0075051 A1* | 4/2003 | Watanabe | B65B 5/12 99/468 |
| 2017/0057675 A1* | 3/2017 | Woehl | B65B 65/006 |
| 2022/0185520 A1 | 6/2022 | de la Rosa et al. | |
| 2023/0002090 A1 | 1/2023 | Bar-Cohen | |

OTHER PUBLICATIONS

Reynolds, "Variety Case Packing," <https://www.packworld.com/secondary-packaging/article/21201143/variety-case-packing> article dated Nov. 9, 2020 (11 pages).

Aagard, "Myrias™ Case Packer," <https://www.aagard.com/varietycasepacking> web page visited Mar. 20, 2024 (2 pages).

Climax Packaging Company, "Why Choose Climax Packaging?" <https://www.climaxpackaging.com/> web page visited Mar. 21, 2024 (3 pages).

* cited by examiner

VARIETY PACKING SYSTEM

BACKGROUND

The present disclosure relates to packing and in particular relates to automated systems for generating variety (mixed-case) packs from single-SKU donor cases.

SUMMARY

In some aspects, the techniques described herein relate to a variety packing system including: a donor case unloading station having a first zone for receiving a donor case having a plurality of a first article and a second zone for receiving a donor case having a plurality of a second article different from the first article; a variety packing conveyor having a packing zone for receiving at least some of the plurality of the first articles and at least some of the plurality of the second articles within an empty case to form a variety packing case; a conveyance system arranged as a loop between the donor case unloading station and the variety packing conveyor, the conveyance system including a plurality of carriages configured to move along the conveyance system, each carriage of the plurality of carriages configured to receive at least some of the plurality of the first articles and/or at least some of the plurality of the second articles; a first pick and place system configured to move individual ones of the plurality of the first articles and individual ones of the plurality of the second articles from the donor case unloading station to the conveyance system; a second pick and place system configured to move individual ones of the plurality of the first articles and individual ones of the plurality of the second articles from the conveyance system to the variety packing conveyor; and a control system programmed to operate the conveyance system, the first pick and place system, and the second pick and place system to form the variety packing case, wherein the variety packing case includes at least one of the first article and at least one of the second article.

In some aspects, the techniques described herein relate to a variety packing system including: a first conveyor positioned at a loading zone for receiving a plurality of articles including a first article of a first variety and a second article of a second variety, the first conveyor configured to move the first article and the second article away from the loading zone; a second conveyor positioned at an unloading zone for unloading the plurality of articles, the second conveyor extending substantially parallel to the first conveyor; a third conveyor extending transverse to the first and second conveyors and configured to move the first article and the second article from the first conveyor to the second conveyor; a fourth conveyor extending transverse to the first conveyor and the second conveyor such that the first conveyor, the third conveyor, the second conveyor, and the fourth conveyor form a loop between the loading zone and the unloading zone; a plurality of carriages configured to move across the first conveyor, the second conveyor, the third conveyor, and the fourth conveyor, each carriage of the plurality of carriages including a plurality of openings configured to each receive one of the first article or the second article.

In some aspects, the techniques described herein relate to a method of forming a variety packing case, the method including: providing a donor case of a plurality of articles of a first variety and a donor case of a plurality of articles a second variety to a loading zone; operating a first pick and place system to remove individual articles of the plurality of articles of the first variety and individual articles of the plurality of articles of the second variety from the respective donor case and place the removed articles into individual openings of a plurality of carriages; transporting the plurality of carriages along a conveyor arranged as a loop extending between the first pick and place system and a second pick and place system; operating the second pick and place system to transport a desired ratio of the individual articles of the first and second varieties from the plurality of carriages to an empty variety packing case at a variety packing conveyor.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
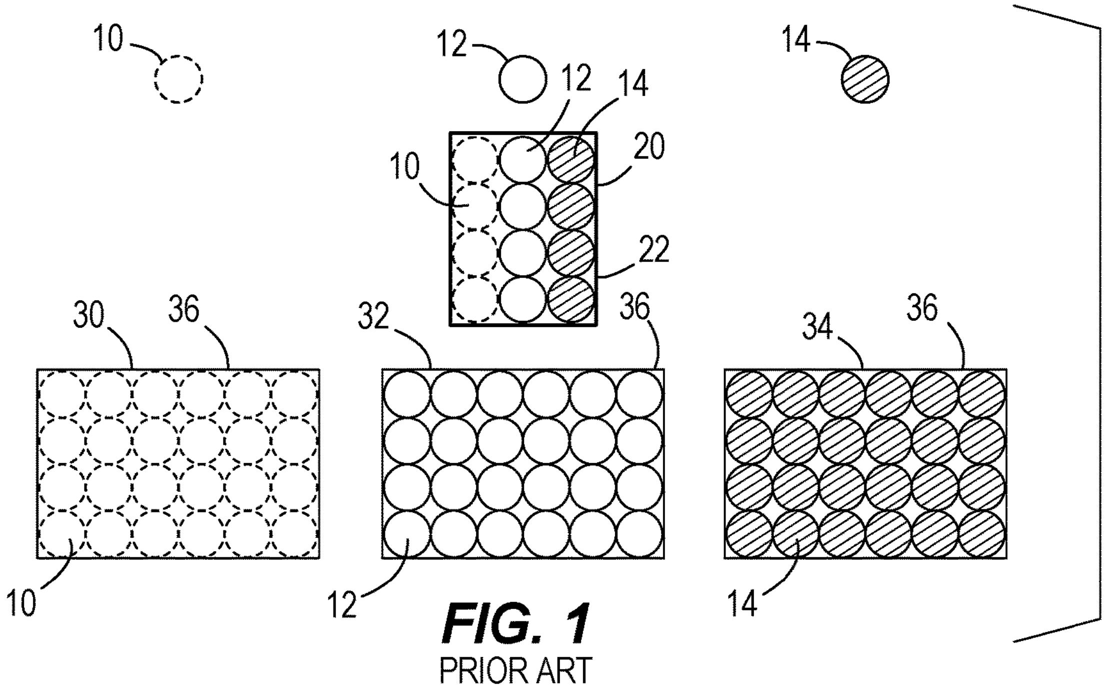
FIG. 1 PRIOR ART
FIG. 1 illustrates individual articles of multiple varieties in various stages.

FIG. 1 illustrates three articles 10, 12, 14 of three different varieties. A first article 10 is illustrated with dashed outlines, representing a first variety. A second article 12 is illustrated with solid outlines (and no fill/hatching), representing a second variety. A third article 14 is illustrated with hatching, representing a third variety. The articles 10, 12, 14 may be for example, beverage containers such as bottles (e.g., plastic or glass), cups, or cans. In other embodiments, the articles 10, 12, 14 may be packages of foodstuffs or other items having a shared form factor (e.g., similarly sized tins, candles, etc.). In some embodiments, the different varieties of the articles 10, 12, 14 are different flavors such that the first article 10 is a food or beverage having a first flavor, the second article 12 is a food or beverage having a second flavor different from the first flavor, and the third article 12 is a food or beverage having a third flavor, different from the first and second flavors. In other embodiments, the different varieties may be different aromas, different brands, different components that are used together, or different components that are used in series. Notwithstanding the difference in variety, the articles 10, 12, 14 may be similar in shape (e.g., all bottles of a similar shape and volume) and type (e.g., all sodas, all sports drinks, all energy drinks, etc.).

A variety case (i.e., a variety packing case) 20 includes one or more (e.g., a plurality) of each of the different articles 10, 12, 14. In some embodiments, the variety case 20 includes two different articles 10, 12. In other embodiments, such as the one shown in FIG. 1, the variety case 20 includes three different articles 10, 12, 14. Other embodiments may include a larger number of varieties of articles. As shown in FIG. 1, the variety case 20 includes an equal amount of the three varieties of articles 10, 12, 14, though in other embodiments, the ratio of the varieties may be otherwise uneven. With continued reference to FIG. 1, the variety case 20 includes linear rows of each variety. In the example shown, a first row includes four of the first article 10, a second row directly adjacent the first row includes four of the second article 12, and a third row directly adjacent the second row includes four of the third article 14. The variety case 20 includes a carrier 22 that maintains the relative positioning of the articles 10, 12, 14 within the variety case 20. The carrier 22 is a base upon which the articles 10, 12, 14 rest and is, for example, a carboard carrier. In some embodiments, the carrier 22 includes sidewalls that extend upward from a base. Additional structure such as a wrapping (e.g., plastic wraparound or shrink wrapping) around the carrier and the articles 10, 12, 14 may be added to further secure the articles 10, 12, 14 within the variety case 20.

FIG. 1 also illustrates single-variety or single-SKU donor cases 30, 32, 34 for each of the three articles 10, 12, 14. The basic structure of the donor cases 30, 32, 34 is similar to the variety case 20, having a carrier 36 for supporting the articles 10, 12, 14. However, rather than including multiple different varieties, the donor cases 30, 32, 34 each include articles 10, 12, 14 of only a single variety. As shown, the first donor case 30 includes only the first article 10, the second donor case 32 includes only the second article 12, and the third donor case includes only the third article 14. As shown, the donor cases 30, 32, 34 are larger than the variety case 20 and hold a greater number of articles 10, 12, 14 than the variety case 20. In the embodiment shown, the donor cases 30, 32, 34 hold twenty-four articles 10, 12, 14 while the variety case 20 holds twelve. These amounts are representative of only one example of the scale of the cases 20, 30, 32, 34 and other sizes supporting other amounts of articles 10, 12, 14 are considered.

Figure 2:
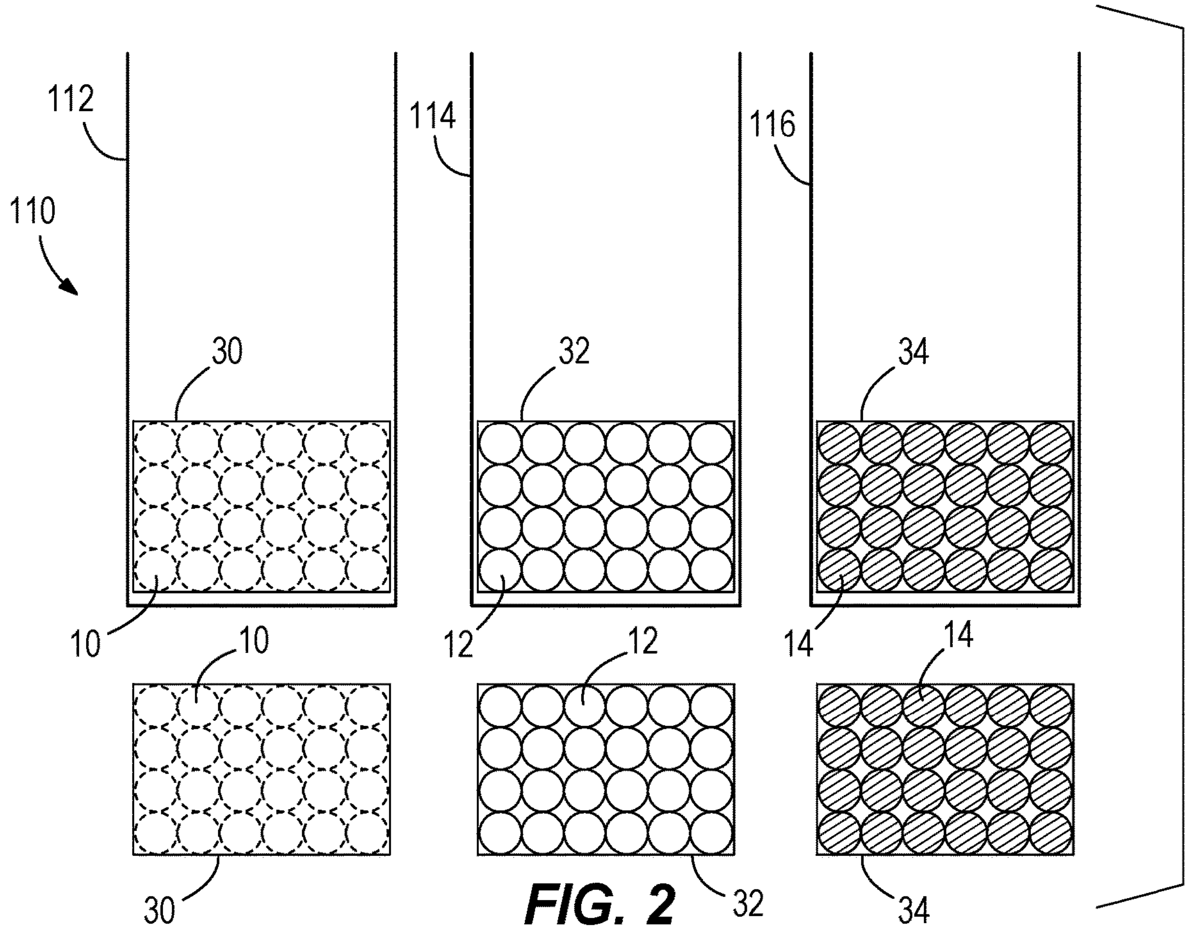
FIG. 2 PRIOR ART
FIG. 2 illustrates an unloading station of a prior art packing system.
Figure 3:
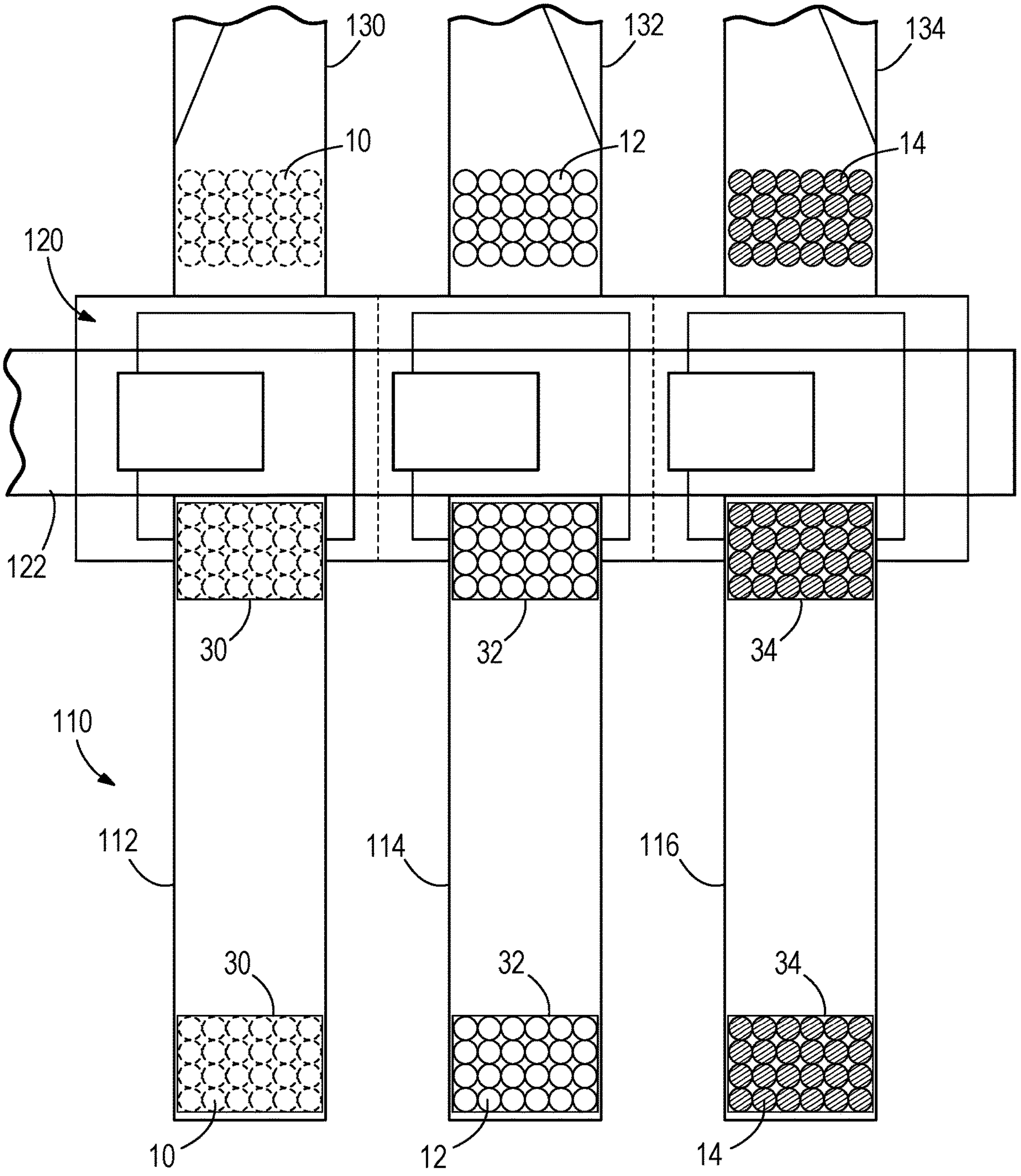
FIG. 3 PRIOR ART
FIG. 3 illustrates the unloading station of FIG. 2 and a further article removal station according to the prior art.
Figure 4:
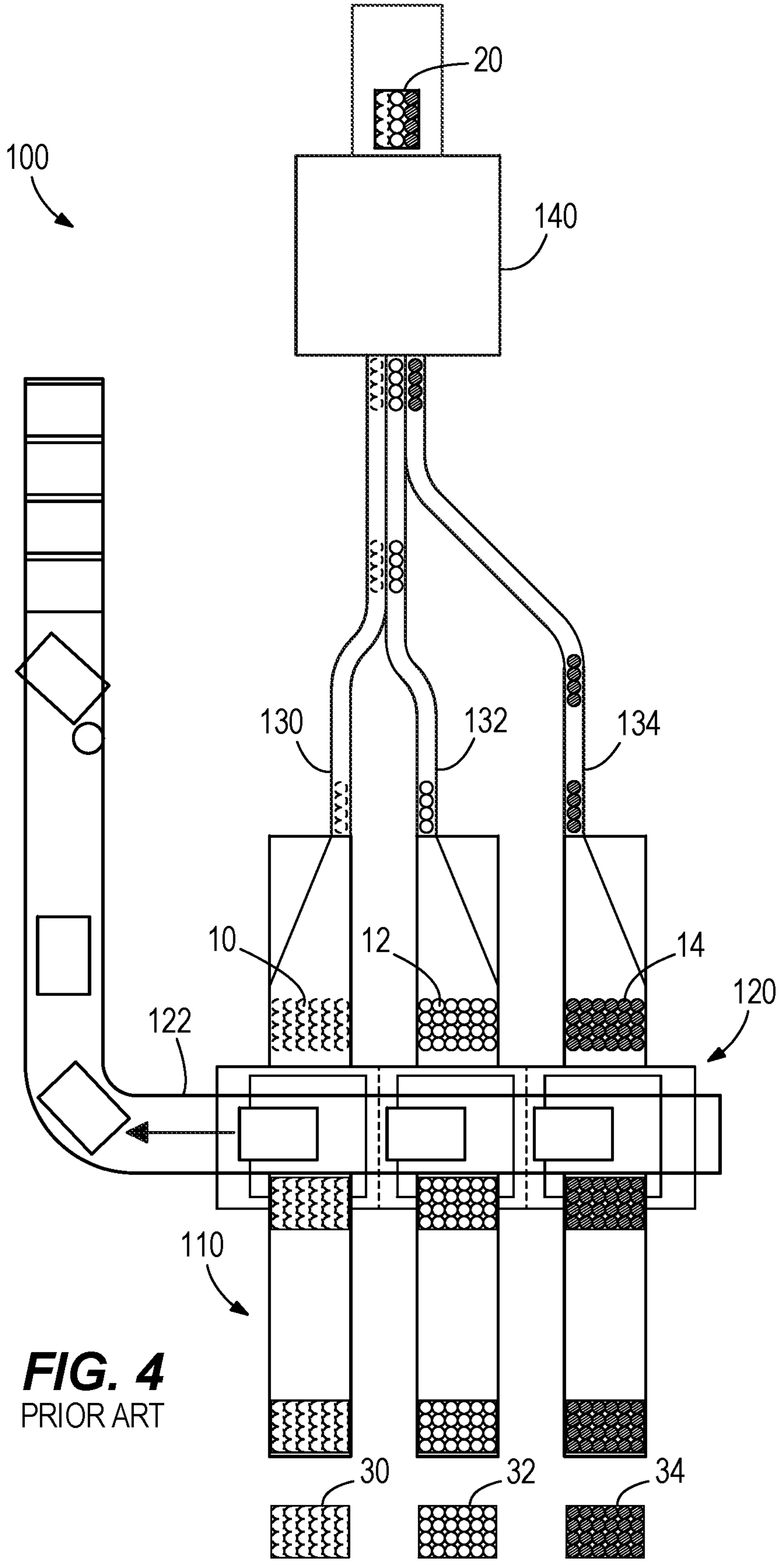
FIG. 4 PRIOR ART
FIG. 4 illustrates a prior art variety packing system having the unloading and article removal stations of FIGS. 2 and 3.
Figure 5:
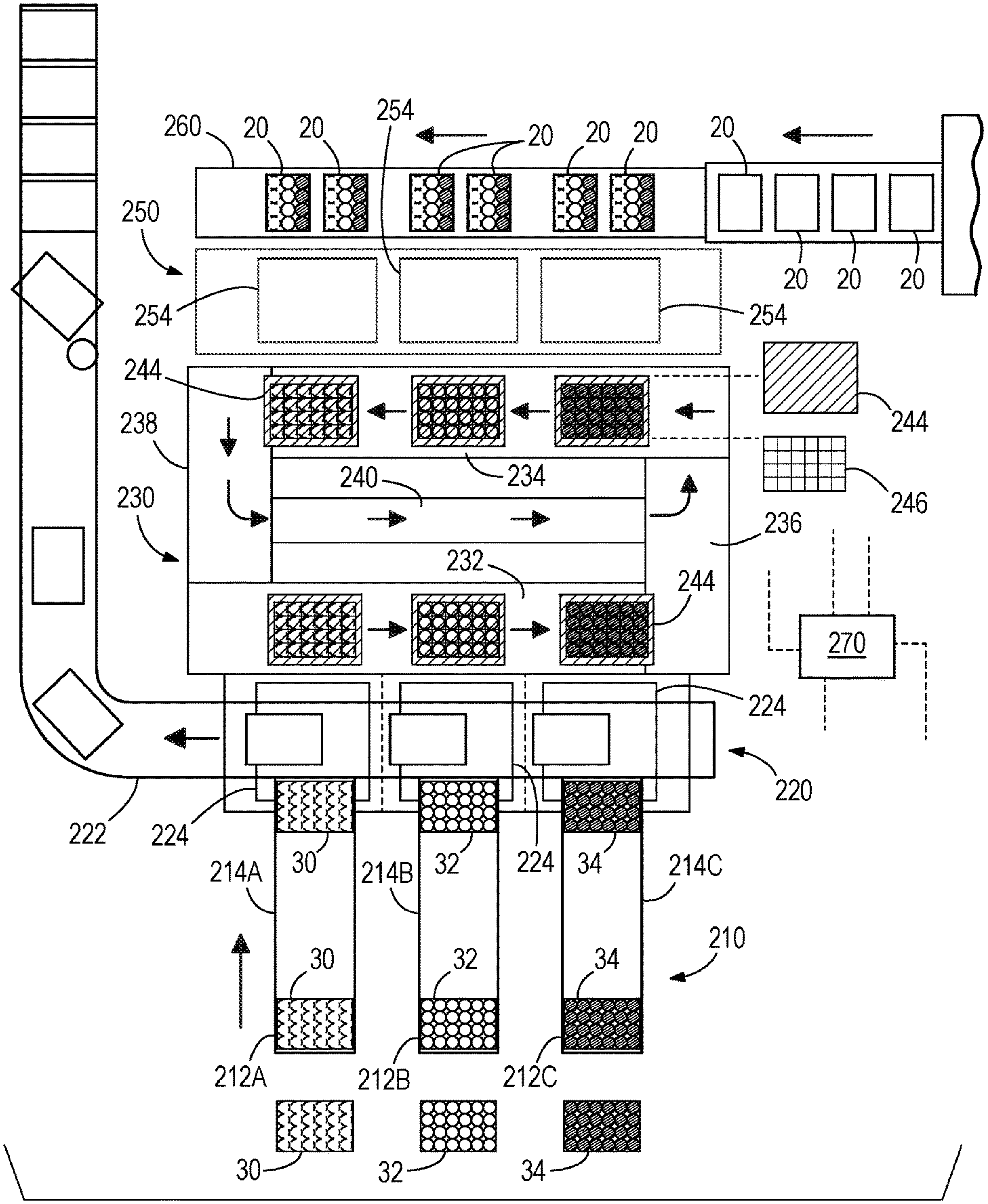
FIG. 5 illustrates a variety packing system.

FIGS. 2-4 illustrate a variety packing system 100 according to the prior art. As shown in FIG. 2, each of the three donor cases 30, 32, 34 is positioned onto an donor case unloading station 110 having three respective conveyor 112, 114, 116. The three conveyors 112, 114, 116 are spaced apart from one another and extend generally parallel to one another. The direction of travel of each conveyor 112, 114, 116 is likewise generally parallel to one another to carry the donor cases 30, 32, 34 away from the donor case unloading station 110 and towards an article removing station 120.

With reference to FIG. 3, the article removing station 120 removes the articles 10, 12, 14 from the donor cases 30, 32, 34 and forwards the separated articles 10, 12, 14 to three respective single filing conveyors 130, 132, 134, as described in greater detail with respect to FIG. 4. The article removing station 120 also includes a conveyor 122 extending transverse to the three conveyors 112, 114, 116 to discharge the empty donor cases 30, 32, 34. FIG. 4 illustrates the single filing conveyors 130, 132, 134 that carry the articles 10, 12, 14 away from the article removing station 120 and towards a case packer 140 to be packed as a variety case 20 in different combinations of flavors and pack sizes. The single filing conveyors 130, 132, 134 narrow in width from adjacent the article removing station 120 towards the case packer 140 such that the individual articles 10, 12, 14 filter into single file rows ahead of the case packer 140.

The variety packing system 100 of the prior art includes a number of deficiencies that can generate inefficiencies in packing. For example, the mass transport of articles 10, 12, 14 on the single filing conveyors 130, 132, 134 can result in shingling and jamming of articles 10, 12, 14, which can result in the articles falling and becoming damaged. The variety packing system 100 of the prior art further has inefficiencies in the layout that require a large space to accommodate the system 100.

A variety packing system 200 is illustrated in FIGS. 5-9. The variety packing system 200 improves on the variety packing system 100 illustrated in FIGS. 2-4 at least by its decreased footprint and omittance of single filing conveyors, thereby eliminating the related shingling and jamming of articles. The variety packing system 200 includes an donor case unloading station 210, a first pick-and-place system 220, a conveyance system 230, and a second pick and place system 250, which includes a variety packing conveyor 260.

Figure 6:
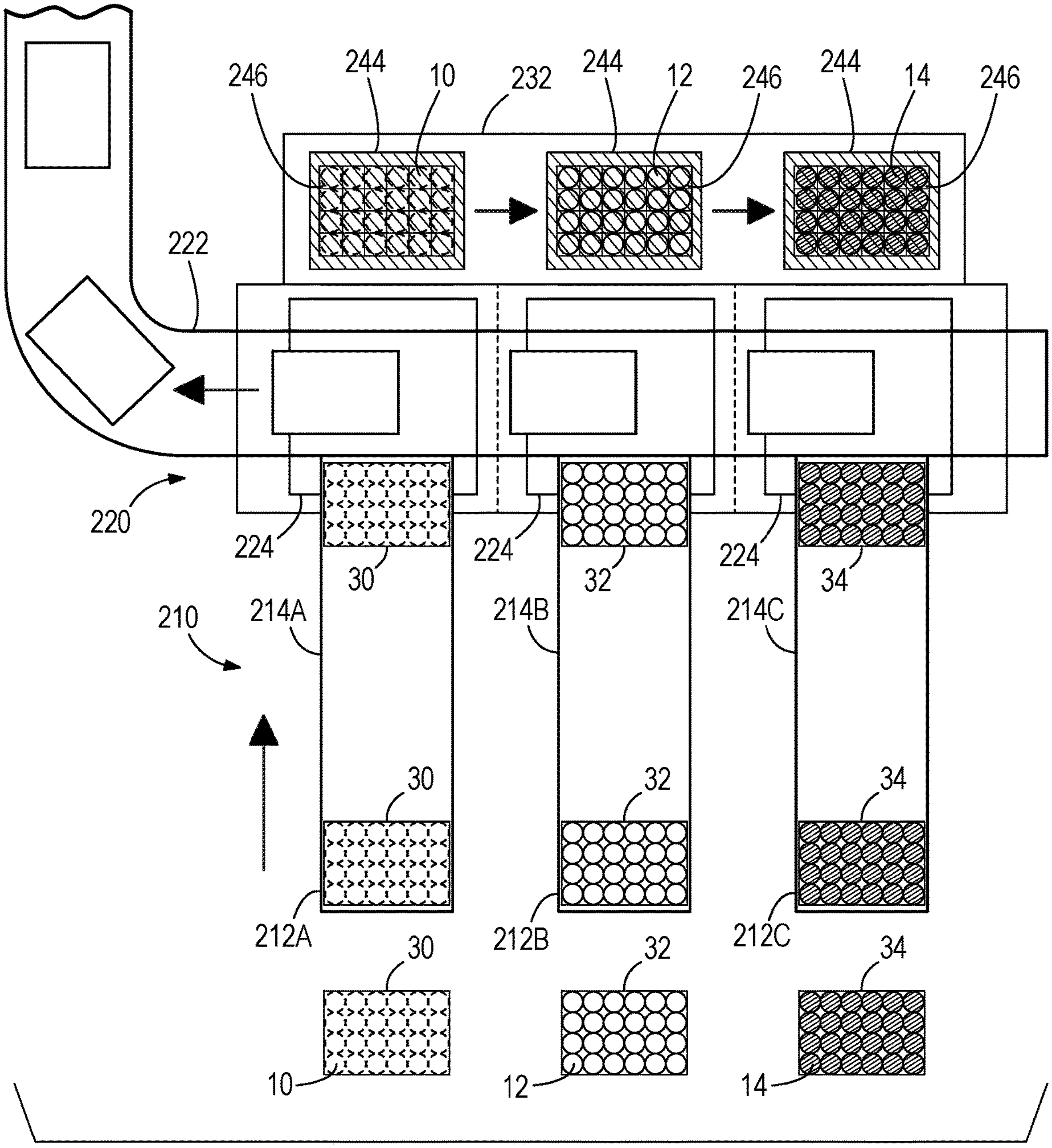
FIG. 6 illustrates an unloading station and first pick and place system of the variety packing system of FIG. 5.

The donor case unloading station 210 of the variety packing system 200, as shown in greater detail in FIG. 6, includes a zone 212A for receiving the first donor case 30 having a plurality of the first articles 10. As shown, the donor case 30 has twenty-four of the first article arranged in a rectangular array of four uniform rows. The first zone 212A is a first end of a conveyor 214A onto which the donor case 30 is placed. The conveyor 214A transports the donor case 30 from the zone 212A towards and to a second end of the conveyor 214A, at which point the donor case 30 is offloaded onto the first pick and place system 220. The donor case unloading station includes multiple (e.g., two, three, four, more than one) conveyors 214A, 214B, 214C corresponding to the number of different articles 10, 12, 14 being provided to the donor case unloading station 210. In the embodiment shown in FIG. 6, the donor case unloading station includes three conveyors 214A, 214B, 214C positioned next to (yet spaced apart) one another. The conveyors 214A, 214B, 214C are oriented parallel to one another with the zones 212A, 212B, 212C for receiving first, second and third, donor cases 30, 32, 34, respectively positioned next to one another. Each of the conveyors 214A, 214*b*, 214C terminates at the first pick and place system 220.

The conveyors 214A, 214B, 214C have a length extending between the respective first and second ends sufficient to simultaneously support and carry multiple of the respective donor cases 30, 32, 34. Each conveyor 214A, 214B, 214C is driven (e.g., via one or more motors) to move respective donor cases 30, 32, 34 from the zones 212A, 212B, 212C at the first end to the first pick and place system 220 at the second end. In some embodiments, sensors (e.g., position sensors, weight sensors, presence sensors, optical sensors) may control movement of the conveyors 214A, 214B, 214C to control offloading of the donor cases 30, 32, 34 to the pick and place system 220 when space is available.

The first pick and place system 220 includes a conveyor 222 running transverse (e.g., perpendicular) to the conveyors 214A, 214B, 214C of the donor case unloading station 210. The conveyor 222 receives the donor cases 30, 32, 34 offloaded from the donor case unloading station 210. As the conveyor 222 extends transverse to the conveyors 214A, 214B, 214C, a single conveyor 222 is configured to receive each of the three donor cases 30, 32, 34. The first pick and place system 220 also includes a mover 224 that grabs individual articles 10, 12, 14 from the donor cases 30, 32, 34 and moves the articles 10, 12, 14 to the conveyance system 230. The mover 224 may be, for example, a robotic gantry or arm programmed to grasp an article 10, 12, 14 from the donor case 30, 32, 34, move the article 10, 12, 14 away from the donor case 30, 32, 34 and release the article 10, 12, 14 into a predetermined location on the conveyance system 230. The first pick and place system 220 may include a supervisory control and data acquisition (SCADA) system. In some embodiments, the mover 224 includes a vacuum lifter (e.g., a vacuum source generating a lifting force for the articles 10, 12, 14 at an end of an arm tool), a linear actuation system, and/or an alternative mechanical actuator. The mover 224 may simultaneously grasp multiple individual articles 10, 12, 14. In some embodiments, the first pick and place system 220 grasps the same amount of articles 10, 12, 14 per transporting operation. In other embodiments, the first pick and place system may identify (e.g., via sensors) how many articles 10, 12, and 14 and which articles 10, 12, 14 are needed in view of the current articles on the conveyance system 230 (and/or on the conveyor 222) and grasp a variable amount of articles 10, 12, 14 based on the sensor inputs. In some embodiments, the pick and place system 220 includes a single mover 224 for moving the three different types of articles 10, 12, 14 to the conveyance system 230. In other embodiments, the pick and place system 220 includes multiple movers 224, such as a mover 224 configured to move the first article 10, a mover 224 configured to move the second article 12, and a mover 224 configured to move the third article.

When the articles 10, 12, 14 have been removed from the donor cases 30, 32, 34, the conveyor 222 moves the empty donor cases 30, 32, 34 away from the first pick and place system 220. The conveyors 214A, 214B, 214C of the donor case unloading station 210 subsequently provide new donor cases 30, 32, 34 to the first pick and place system 220.

Figure 7:
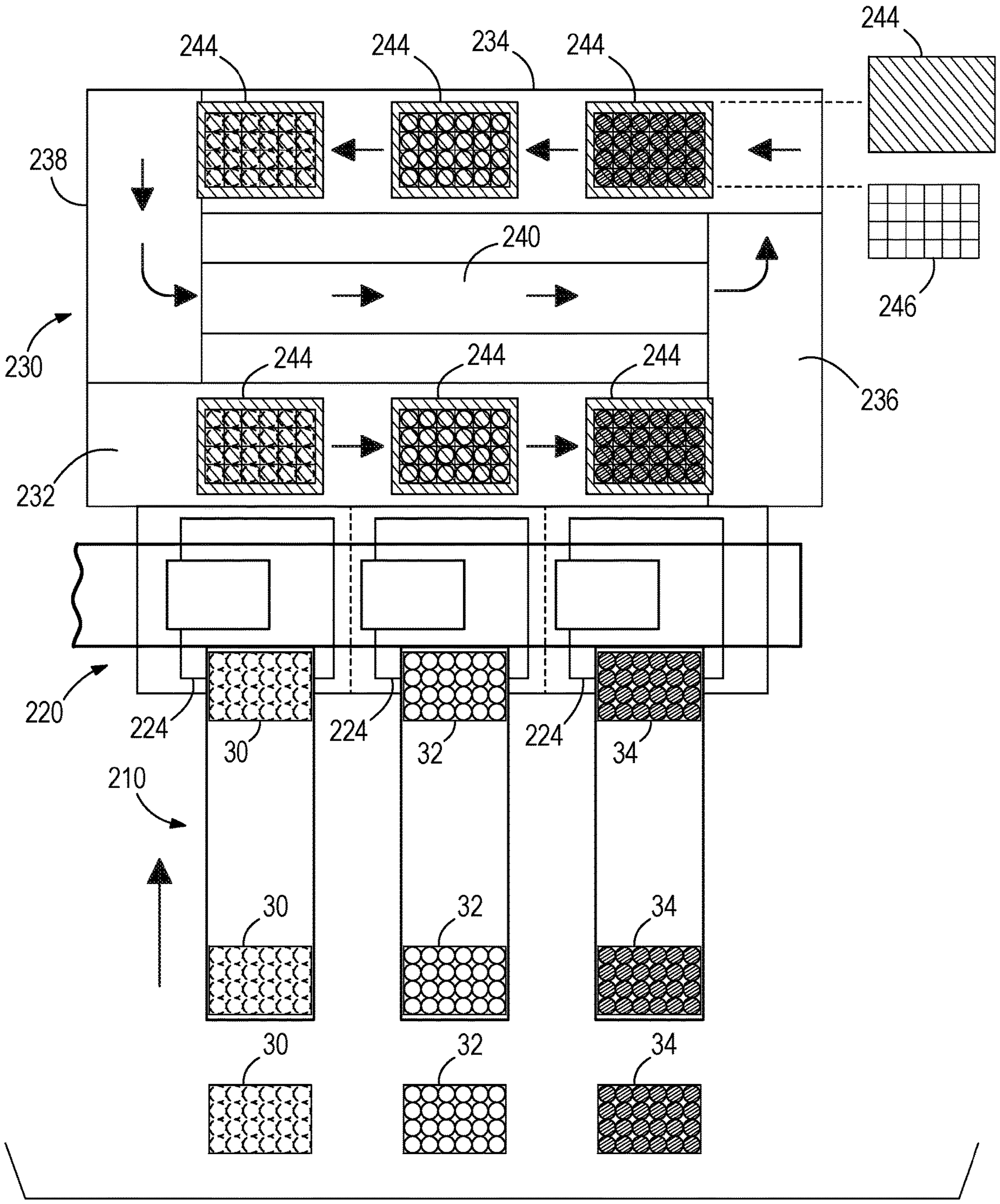
FIG. 7 illustrates the unloading station, the first pick and place system, and an automated conveyance system of the variety packing system of FIG. 5.

With reference to FIG. 7, the first pick and place system 220 places the articles 10, 12, 14 onto carriages 244 of the conveyance system 230. The carriages 244 are platforms that support the articles 10, 12, 14 and are positioned on conveyors of the conveyance system 230. In some embodiments, when the first pick and place system 220 releases the articles 10, 12, 14 to a carriage 244, the articles 10, 12, 14 rest upon a surface of the carriage 244. In other embodiments, the articles 10, 12, 14 are suspended or otherwise positioned above the carriage 244. Each carriage 244 includes a grid 246 defining openings for receiving individual ones of the articles 10, 12, 14. Written another way, when articles 10, 12, 14 are positioned on the carriage 244 within the grid 246, the articles 10, 12, 14 are separated from one another by the grid 246. The grid provides consistent locations for placement and removal of the articles 10, 12, 14 relative to the carriage 244. The grid 246 also prevents tipping of the articles 10, 12, 14 and limits interaction between the articles 10, 12, 14. In some embodiments, the first pick and place system 220 groups articles 10, 12, 14 together such that only a single type of article (e.g., first articles) are placed on a single carriage 244. In other embodiments, the first pick and place system 220 may place a mixture of first, second, and third articles 10, 12, 14 into a single carriage 244.

Figure 8:
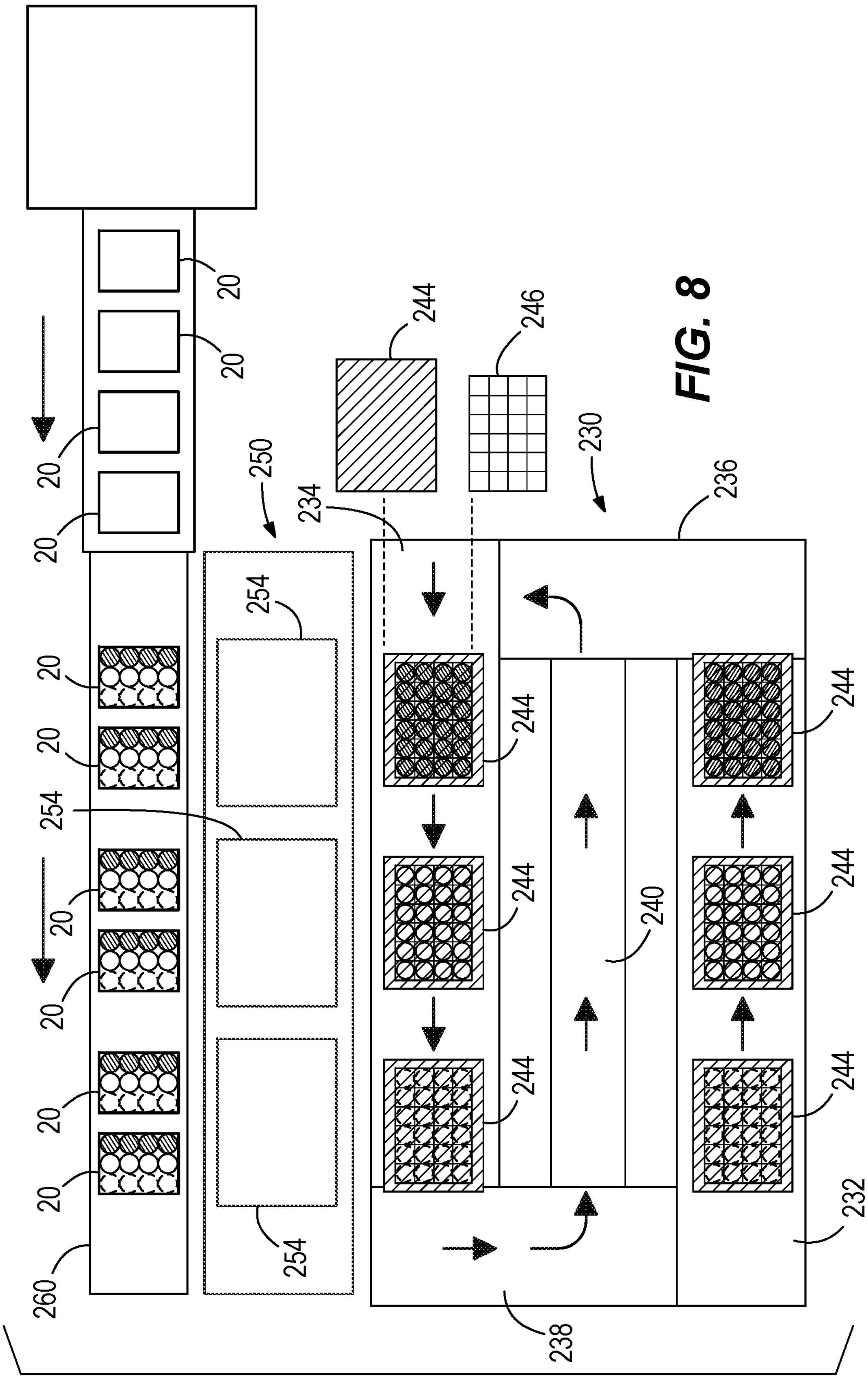
FIG. 8 illustrates the automated conveyance system, a second pick and place system, and a variety packing station of the variety packing system of FIG. 5.

With continued reference to FIG. 7, the conveyance system 230 includes an arrangement of conveyors 232, 234, 236, 238, 240 that move the articles 10, 12, 14 away from the first pick and place system 220 and to a second pick and place system 250 (FIG. 8). A first conveyor 232 is positioned adjacent to and extends parallel to the conveyor 222 of the first pick and place system 220. The first conveyor 232 defines a loading zone in which the first pick and place system releases the articles 10, 12, 14 onto the carriages 244 located on the first conveyor 232. The first conveyor 232 is driven to move the carriages 244 (and articles 10, 12, 14 thereon) away from the loading zone. In a normal mode of operation, the first conveyor 232 moves in a first direction (i.e., to the right in FIG. 7). A second conveyor 234 extends substantially parallel to the first conveyor 232 and is positioned adjacent the second pick and place system 250. The second conveyor 234 moves in an opposite direction (i.e., to the left in FIG. 7), compared to the first conveyor 232 and defines an unloading zone in which the second pick and place system 250 grasps the articles 10, 12, 14 from the carriages 244.

A third conveyor 236 extends transverse (e.g., perpendicular) to the first and second conveyors 232, 234 and connects the first conveyor 232 to the second conveyor. During normal operation, the third conveyor 236 is driven to move the carriages 244 from the first conveyor 232 to the second conveyor 234. A fourth conveyor 238 extends transverse (e.g., perpendicular) to the first and second conveyors 232, 234 and, in some embodiments, extends parallel to the third conveyor 236. The fourth conveyor 238 connects the first and second conveyors 232, 234 and transports carriages 244 from the second conveyor 232 towards the first conveyor 232. Collectively, the first, second, third, and fourth conveyors 232, 234, 236, 238 form a loop such that carriages 244 and articles 10, 12, 14 on any of the four conveyors 232, 234, 236, 238 can move to any of the other conveyors 232, 234, 236, 238 without modifying a movement direction of any of the conveyors 232, 234, 236, 238. As shown, the loop moves carriages 244 in a counterclockwise direction from the first conveyor 232, to the third conveyor 236, to the second conveyor 234, to the fourth conveyor 238, and back to the first conveyor 232 during normal operation.

A fifth conveyor 240 extends between the third and fourth conveyors 236, 238 at a location between the first and second conveyors 232, 234. The fifth conveyor 240 extends substantially parallel to the first and second conveyors 232, 234, such that the arrangement of the five conveyors 230, 232, 234, 236, 238 includes two loops. The fifth conveyor 240 is a bypass conveyor that allows carriages 244 to bypass one of the first conveyor 232 or the second conveyor 234. For example, a carriage 244 on the first conveyor 232 may be loaded with first articles 10 but not of immediate need at the second pick and place system 250 and may be temporarily moved from the first conveyor 232, to the third conveyor 236, and to the fifth conveyor 240. As a further example, a carriage 244 at the unloading zone of the second conveyor 234 may still carry a substantial amount of articles 10, 12, 14 but may need to move from the unloading zone (e.g., to allow a carriage 244 carrying different articles 10, 12, 14 to enter the unloading zone, to allow an empty carriage 244 to return to the loading zone of the first conveyor 232), but does not yet need to receive more articles 10, 12, 14. Such a carriage 244 may move from the second conveyor 234, to the fourth conveyor 238, and to the fifth conveyor 240, thereby bypassing the first conveyor 232 on a return path to the second conveyor 234. The articles 10, 12, 14 within the carriage 244 that takes the bypass 240 can then return to the unloading zone to complete the filling of variety packs 20 as needed.

As shown in FIG. 8, the second pick and place system 250 takes individual articles from the conveyance system 230 (at the unloading zone on the second conveyor 234) and moves them to a variety packing conveyor 260 of the second pick and place system 250. In some embodiments, the second pick and place system 250 is similar to the first pick and place system 220. The conveyor 260 extends parallel to the second conveyor 232 and is located adjacent to the second conveyor 232 of the conveyance system 230.

A mover 254, which in some embodiments is similar to the mover 224 of the first pick and place system 220, grasps articles 10, 12, 14 from the carriages 244 within the unloading zone and places the articles 10, 12, 14 into empty variety cases 20. The empty variety cases 20 are moved by the conveyor 260 towards the movers 254. In some embodiments, the movers 254 are associated with different empty variety cases, such that three (as shown) movers 254 can simultaneously fill three empty variety cases 20. In such embodiments, as each variety case 20 includes each (or at least some) of the different varieties 10, 12, 14, each mover 254 of the second pick and place system 250 is configured to move each of the different varieties of articles 10, 12, 14. In other embodiments, individual movers 254 interact only with specific articles 10, 12, 14. Once filled by the movers 254 with the desired mixture of articles 10, 12, 14, the filled variety cases 20 are moved by the conveyor 260 away from the movers 254. Subsequently, the variety cases 20 may be further packaged (e.g., wrapped) and shipped.

A control system 270 is programmed to control operation of the variety packing system 200. In some embodiments, the control system 270 includes a central control system programmed to control each of the different elements of the variety packing system 200. In other embodiments, the control system 270 includes multiple control systems, each configured to control individual elements (e.g., the donor case unloading station 210, the variety packing conveyor 260, the conveyance system 230, the first pick and place system 220, the second pick and place system 250, etc.) of the variety packing system 200. In such embodiments, the various control systems have communication modules for communicating with one another to collectively function based on the inputs of the different control systems. The control system 270 controls operation of the various conveyors 214A, 214B, 214C, 222, 232, 234, 236, 238, 240, 260 including controlling starting, stopping, speed, and acceleration of the same. The control system 270 further controls operation of the first and second pick and place systems 230, 250 to control the number of articles 10, 12, 14 grasped, which articles 10, 12, 14 are grasped, and where the articles are deposited. Further, the control system controls the monitoring and sensing of the variety packing system 200 to monitor, update, and record the amount of articles 10, 12, 14 at the first pick and place system 230, the amount of articles in each respective carriage 244, the location of each carriage 244, and the amount of articles in each variety case 20 on the variety packing conveyor 260. The control system 270 controls operation of the conveyance system 230 to selectively move the various carriages 244 along the conveyance system 230 to maximize the loading time at the second pick and place system 250. This may include, for example, directing carriages 244 along any of the five conveyors 232, 234, 236, 238, 240, and allowing carriages 244 to bypass other carriages 244 by utilizing the multiple loops of the conveyance system 230.

In operation, a user (or conveyance mechanism) provides first, second, and third donor cases 30, 32, 34 having first, second, and third articles 10, 12, 14, respectively, to three unloading zones 212A, 212B, 212C, respectively, of an unloading station 210 of a variety packing system 200. Each of the donor cases 30, 32, 34 are moved along their respective conveyor 214A, 214B, 214C to a first pick and place system 220. Additional donor cases 30, 32, 34 may be loaded onto the unloading station 210 to provide further articles 10, 12, 14 to the variety packing system 200. At the first pick and place system 220, a mover 224 removes individual articles 10, 12, 14 from their respective donor cases 30, 32, 34 and deposits the articles 10, 12, 14 into carriages 244 on the conveyance system 230. A grid 246 provides separation of the multiple articles 10, 12, 14 on each carriage 244. Once emptied, the donor cases 30, 32, 34 are moved away from the first pick and place system 220 via a conveyor 222. Once within the carriages 244, the conveyance system 230 moves the articles 10, 12, 14 from a first conveyor 232, turned along a third conveyor 236, and turned once more along a second conveyor 234 to locate the articles 10, 12, 14 adjacent a second pick and place system 250. The conveyance system 230 continues to move the carriages 244 as necessary (i.e., to return an empty carriage to the first conveyor 232 adjacent the first pick and place system). A variety packing conveyor 260 transports an empty variety case 20 to the second pick and place system 250. The movers 254 of the second pick and place system 250 position articles 10, 12, 14 from the carriages 244 into the variety cases 20 to create a filled variety pack 20 having a plurality of each of the articles 10, 12, 14. Once filled, the variety packing conveyor 260 then moves the filled variety pack 20 away from the second pick and place system 250 for further packaging and/or shipping.

Figure 9:
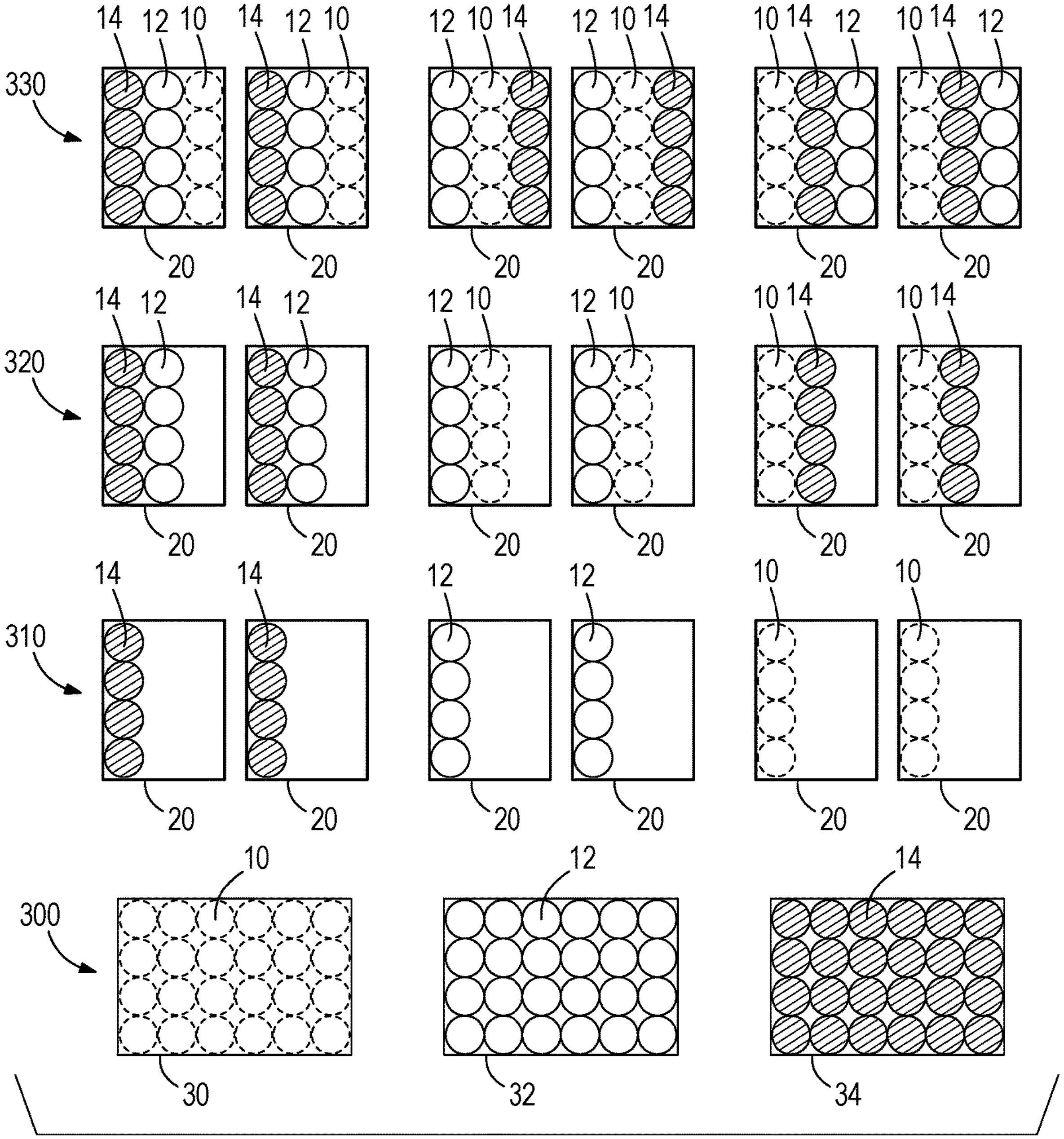
FIG. 9 illustrates an example of consecutive packing steps of a variety pack using the variety packing system of FIG. 5.

FIG. 9 illustrates various stages of loading a variety pack 20, according to one embodiment. Donor cases 30, 32, 34 are shown at step 300 with a donor case 30 having first articles 10 shown on the left, a donor case 32 having second articles 12 shown in the middle, and a donor case 34 having third articles 14 shown on the right. The first pick and place system 220 moves the first, second, and third articles 10, 12, 14 to three carriages 244 located in the loading zone along the first conveyor 232. The three carriages 244 move around the loop to the unloading zone along the second conveyor 234. Three additional carriages 244 continue the process by filling once again with the three varieties of articles 10, 12, 14. With the first three carriages 244 located in the unloading zone, the second pick and place system 250 grasps a column (in this example, four articles) to place into the empty variety packs 20 located adjacent the three movers 254, as shown at step 310. The carriages 244 then move along the second conveyor 234 to the next mover 254. The movers add another column of the next variety to the variety packs 20, as shown at step 320. Having moved along the conveyor 234, the article 10, 12, 14 added is different from the first column. With one more movement of the carriages 244 along the conveyor 234, the articles are again grasped by the movers 254 and placed into the variety packs 20 to add the third variety to each pack. In the embodiment shown, each mover 254 is configured to simultaneously fill multiple (e.g., two) variety cases 20. In other embodiments, more or fewer variety cases 20 may be filled by each mover 254. The example as described above utilizes a pattern of loading within the carriages 244 of the conveyance mechanism 230, though such a pattern is not necessary and the control system 270 may identify alternative loading of the carriages 244 (e.g., multiple different varieties of articles within a single carriage 244) to more efficiently load the variety packs 20.

The variety packing system 200 provides advantages over alternative arrangements of variety packing systems. For example, the compact footprint of the variety packing system 200 allows for implementation of the system 200 within more spaces and provides additional room for related activities (e.g., packaging, storage). Further, the variety packing system 200 omits article singulation and laning, preventing fallen and damaged articles, shingling, and traffic jams associated with singulation. The grid 246 prevents fallen or damaged articles and limits any interaction between articles. Additionally, the flexibility of the pick and place systems 220, 250 with the conveyance system 230 allows for non-uniform loading (e.g., six of a first article 10, eight of a second article 12, and ten of a third article 12) of articles into the variety packs 20, if desired. The system 200 is also flexible to increase or decrease the number of varieties that can be incorporated into variety packs as the control system 270 can control which articles to add to the carriages 244 at different times as necessary for loading the variety packs 20 in a desired manner. A further advantage of the variety packing system 200 is that each of the varieties of articles 10, 12, 14 are moved along the same conveyors 232, 234, 236, 238, 240, eliminating the separate conveyors for each variety after decasing required by some alternative variety packing systems. Additionally, as the articles 10, 12, 14 only move when in full cases (donor cases 30, 32, 34 or variety packs) or when in an individual opening of the grid 246, the variety packing system 200 can pack a variety of articles (e.g., glass bottles, plastic bottles, cans, etc.) including fragile articles that may not be suitably sorted and packaged by some variety packing systems that move loose, individual articles at high speeds.

Various features of the disclosure are set forth in the following claims.

What is claimed is:

1. A variety packing system comprising:

a donor case unloading station having a first zone for receiving a donor case having a plurality of a first article and a second zone for receiving a donor case having a plurality of a second article different from the first article;

a variety packing conveyor having a packing zone for receiving at least some of the plurality of the first articles and at least some of the plurality of the second articles within an empty case to form a variety packing case;

a conveyance system arranged as a loop between the donor case unloading station and the variety packing conveyor, the conveyance system comprising a plurality of carriages configured to move along the conveyance system, each carriage of the plurality of carriages configured to receive at least some of the plurality of the first articles and/or at least some of the plurality of the second articles;

a first pick and place system configured to move individual ones of the plurality of the first articles and individual ones of the plurality of the second articles from the donor case unloading station to the conveyance system;

a second pick and place system configured to move individual ones of the plurality of the first articles and individual ones of the plurality of the second articles from the conveyance system to the variety packing conveyor; and a control system programmed to operate the conveyance system, the first pick and place system, and the second pick and place system to form a variety packing case, wherein the variety packing case includes at least one of the first article and at least one of the second article.

2. The variety packing system of claim 1, wherein each carriage includes a plurality of openings, and wherein each opening of the plurality of openings is configured to receive only a single one of the plurality of the first articles or a single one of the plurality of the second articles.

3. The variety packing system of claim 1, wherein the plurality of carriages includes a first carriage and a second carriage, wherein the first pick and place system is programmed to provide the plurality of the first articles to the first carriage and is programmed to provide the plurality of the second articles to the second carriage.

4. The variety packing system of claim 1, wherein the loop of the conveyance system includes a first conveyor arranged adjacent the donor case unloading station, a second conveyor arranged adjacent the variety packing conveyor, a third conveyor extending from the first conveyor to the second conveyor, and a fourth conveyor extending from the second conveyor to the first conveyor.

5. The variety packing system of claim 4, wherein the first conveyor extends substantially parallel to the second conveyor and the third and fourth conveyors extend transverse to the first and second conveyors.

6. The variety packing system of claim 4, further comprising a fifth conveyor extending between the fourth and third conveyors as a bypass of the first conveyor.

7. The variety packing system of claim 1, further comprising an empty case conveyor configured to move the donor case from the donor case unloading station when the donor case is emptied by the first pick and place system.

8. The variety packing system of claim 1, wherein the first zone of the donor case unloading station is spaced apart from and distinct from the second zone of the donor case unloading station.

9. The variety packing system of claim 1, wherein each of the first and second pick and place systems is configured to simultaneously engage and transport multiple articles of the first and/or second articles.

10. A variety packing system comprising:

a first conveyor positioned at a loading zone for receiving a plurality of articles including a first article of a first variety and a second article of a second variety, the first conveyor configured to move the first article and the second article away from the loading zone;

a second conveyor positioned at an unloading zone for unloading the plurality of articles, the second conveyor extending substantially parallel to the first conveyor;

a third conveyor extending transverse to the first and second conveyors and configured to move the first article and the second article from the first conveyor to the second conveyor;

a fourth conveyor extending transverse to the first conveyor and the second conveyor such that the first conveyor, the third conveyor, the second conveyor, and the fourth conveyor form a loop between the loading zone and the unloading zone; and a plurality of carriages configured to move across the first conveyor, the second conveyor, the third conveyor, and the fourth conveyor, each carriage of the plurality of carriages including a plurality of openings configured to each receive one of the first article or the second article.

11. The variety packing system of claim 10, further comprising a fifth conveyor extending substantially parallel to the first conveyor and the second conveyor, the fifth conveyor extending between the third conveyor and the fourth conveyor and configured to move the plurality of carriages from the fourth conveyor to the third conveyor, bypassing the first conveyor.

12. The variety packing system of claim 10, further comprising a first pick and place system configured to provide a plurality of the first articles and a plurality of the second articles to one or more of the plurality of carriages on the first conveyor and a second pick and place system configured to remove the plurality of the first articles and the plurality of the second articles from the one or more of the plurality of carriages at the second conveyor.

13. The variety packing system of claim 10, wherein each conveyor of the first conveyor, the second conveyor, the third conveyor, and the fourth conveyor is distinct and separate from one another.

14. The variety packing system of claim 10, further comprising a control system programmed to control movement of the first conveyor, the second conveyor, the third conveyor, and the fourth conveyor based on a quantity and a variety of the articles within the plurality of carriages.

15. A method of forming a variety packing case, the method comprising:

providing a donor case of a plurality of articles of a first variety and a donor case of a plurality of articles a second variety to a loading zone;

operating a first pick and place system to remove individual articles of the plurality of articles of the first variety and individual articles of the plurality of articles of the second variety from the respective donor case and place the removed articles into individual openings of a plurality of carriages;

transporting the plurality of carriages along a conveyor arranged as a loop extending between the first pick and place system and a second pick and place system; and operating the second pick and place system to transport a desired ratio of the individual articles of the first and second varieties from the plurality of carriages to an empty variety packing case at a variety packing conveyor.

16. The method of claim 15, wherein transporting the plurality of carriages along the conveyor includes transporting the plurality of carriages along a first conveyor on which the first pick and place system is operable to deposit the individual articles of the first and second varieties, and transporting the plurality of carriages along a second conveyor on which the second pick and place system is operable to remove the individual articles of the first and second varieties, the second conveyor configured to move the carriage substantially parallel to the first conveyor.

17. The method of claim 16, wherein transporting the plurality of carriages along the conveyor includes transporting the plurality of carriages from the first conveyor, along a third conveyor, and to the second conveyor and transporting the plurality of carriages from the second conveyor, along a fourth conveyor, to the first conveyor, the third and fourth conveyors extending transverse to the first and second conveyors.

18. The method of claim 17, wherein transporting the plurality of carriages along the conveyor includes selectively transporting the plurality of carriages along a fifth conveyor extending from the fourth conveyor to the third conveyor, bypassing the first conveyor.

19. The method of claim 15, wherein the first pick and place system removes the individual articles of the first variety and places them within a first carriage of the plurality of carriages, and wherein the first pick and place system removes the individual articles of the second variety and places them within a second carriage of the plurality of carriages.

20. The method of claim 15, wherein the variety packing conveyor maintains a position of the empty variety packing case until the variety packing case is filled with the desired ratio of the individual articles of the first and second varieties, the method further comprising moving the filled variety packing case from the variety packing conveyor.

* * * * *